July 21, 1964 D. R. CUNNINGHAM ETAL 3,141,394

DOCUMENT RECORDING SYSTEMS

Filed Feb. 26, 1963 3 Sheets-Sheet 1

INVENTORS:
DAVID R. CUNNINGHAM
ARIE W. HARTMAN
LEWIS E. SOMERS
JOHN D. STONE

BY Robert P. Strack

THEIR ATTORNEY.

DOCUMENT RECORDING SYSTEMS

Filed Feb. 26, 1963 3 Sheets-Sheet 2

INVENTORS:
DAVID R. CUNNINGHAM
ARIE W. HARTMAN
LEWIS E. SOMERS
JOHN D. STONE
BY
Robert R. Strack
THEIR ATTORNEY.

DOCUMENT RECORDING SYSTEMS

Filed Feb. 26, 1963 3 Sheets-Sheet 3

INVENTORS:
DAVID R. CUNNINGHAM
ARIE W. HARTMAN
LEWIS E. SOMERS
JOHN D. STONE
BY Robert R. Strack
THEIR ATTORNEY.

United States Patent Office 3,141,394

Patented July 21, 1964

3,141,394
DOCUMENT RECORDING SYSTEMS

David R. Cunningham, Syracuse, N.Y., Lewis Edmond Somers, Bethlehem, Pa., and John D. Stone, Pennellville, and Arie W. Hartman, Liverpool, N.Y., assignors to General Electric Company, a corporation of New York Filed Feb. 26, 1963, Ser. No. 261,575
7 Claims. (Cl. 95—1.7)

This invention relates to document recording systems, and more particularly, to recording systems using flexible recording media.

The present invention is described in conjunction with a thermoplastic recording system such as shown in patent application Serial No. 261,578 (Docket No. 37-76D-2), filed concurrently herewith by C. E. Cady, D. R. Cunningham and J. D. Stone, and assigned to the General Electric Company. In thermoplastic recording, an electrosatic charge pattern corresponding to an image to be recorded is developed upon the thermoplastic medium. Frequently, the charge pattern is developed by placing the medium in close proximity to a photoconductive surface and irradiating the surface with light while generating an electric field in the gap between the medium and the surface. If the light is first intensity modulated by transmission through, or more preferably, by reflection from an information bearing document, the charge pattern developed will correspond to the information on the document. Once an electrostatic charge resides on the thermoplastic, it is softened to permit the forces resulting therefrom to form surface impressions conforming to the charge pattern. Subsequent cooling establishes a permanent record which may be converted to visual information by the Schlieren technique of projecting light through the recording medium.

In practical applications of thermoplastic recording, the thermoplastic is fabricated in film form on a flexible conducting surface. This permits easier handling than the use of solid plates or the like. However, it introduces difficulties from the standpoint of the recording operation. While developing the electrostatic charge pattern on the film, the electric field created is generally impressed by a high voltage source having a magnitude in the neighborhood of 1000 volts. This voltage, as well as the developing charge pattern, creates forces between the thermoplastic film and the photoconductive surfaces which tend to deform the film by bending or bowing it into the gap therebetween. Reliable recording requires a close tolerance separation between the thermoplastic and photoconductive surfaces. Any disturbance of planar parallelism between these surfaces upsets the generation of an electrostatic charge pattern that accurately represents the modulated light image.

An object of the present invention is to provide improved means for accurately establishing a separation of close tolerance between a first and second surface.

Another object of the present invention is to provide means for rigidly maintaining a film surface in a substantially parallel plane to another surface while an electric field is impressed therebetween.

Recording by means of selectively creating surface impressions for subsequent detection by use of a Schlieren optical system introduces the need for some form of light sampling. As more fully explained hereinafter, the information modulated light input must be broken up into a relatively large number of segments to produce a satisfactory surface deforming charge pattern for high resolution recording. One known technique for creating these segments of a total pattern involves interposing a plurality of opaque areas or lines in the light path between the original light source and the recording surface. For example, the segmenting means may take the form of a grid wherein the lines are opaque and the spaces therebetween are transparent.

Heretofore, such grids have been placed in various locations in an attempt to find the optimum position. If the grid is placed close to the original document, and reflected light therefrom is used for the modulated light source, grid reflections and shadowing develop to impair resolution. Other locations introduce similar difficulties from a focusing standpoint.

Another object of the invention is to provide a light dissecting grid optimally positioned to afford maximum resolution and focusing of a modulated light upon a recording assembly.

As described hereinafter, the invention is illustrated in cooperation with a complete thermoplastic recording system. In an illustrative embodiment, a unique exposure apparatus is shown wherein the photoconductive surface is rigidly supported in a movable assembly including a conducting layer on one side and a pair of separating shims on the other. During exposure, this assembly is urged into contact with a transparent thermoplastic film comprising a thermoplastic surface, a conductive layer, and a flexible substrate; the recording area of the film being separated from the photoconductive surface due to contact with the shims on the periphery thereof. The film is supported and maintained in position by means of a unique transparent plate having a light dissecting grid impressed on the surface thereof and a vacuum channel surrounding the recording area. The vacuum channel is evacuated while the film experiences deforming electrostatic forces and thereby counteracts the detrimental distortion effects introduced by such forces.

The novel features that are believed characteristic of this invention are set forth with particularity in the appended claims. The invention itself, however, both as to its organization and method of operation, together with further objects and advantages thereof, may best be understood by reference to the following description taken in conjunction with the accompanying drawings wherein:

Figures 1, 2:
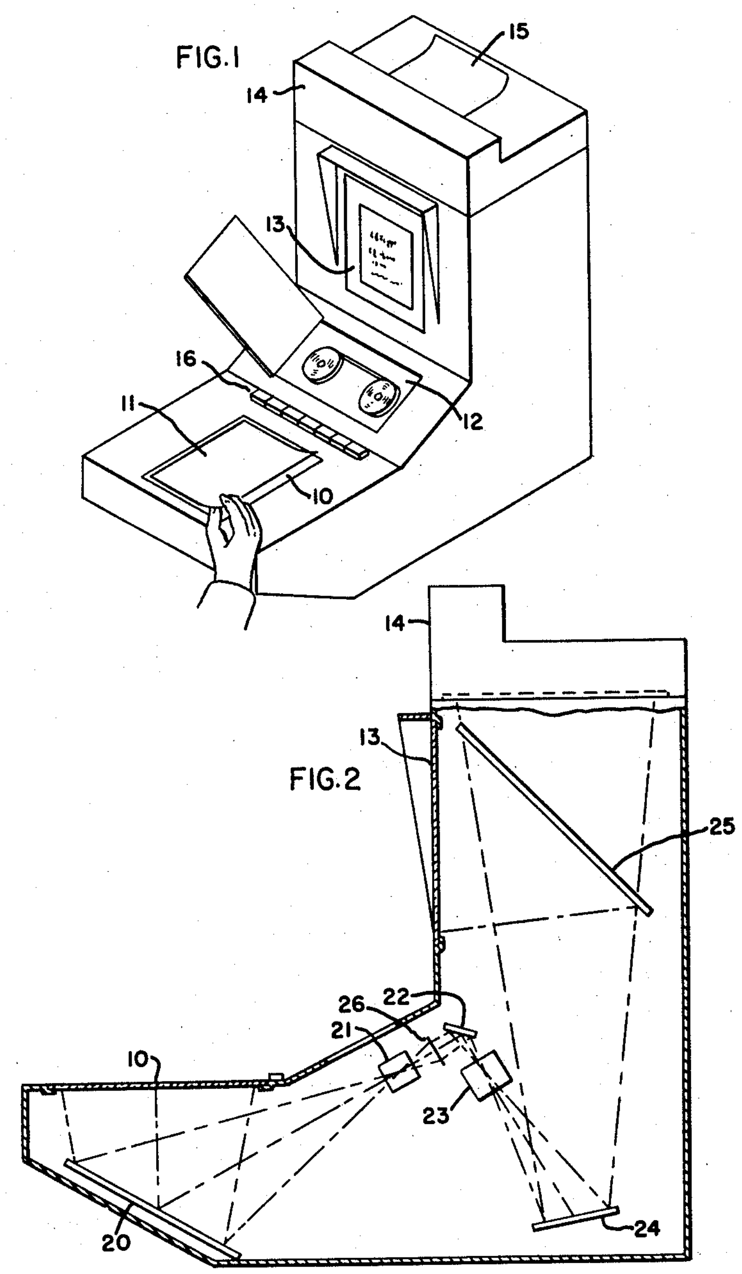
FIGURE 1 shows a typical console housing the system of the present invention.
FIGURE 2 is a diagrammatic view of the optical path in an illustrative embodiment of the invention.

The compact form that equipment embodying the present invention may take, is evident from the desk top model shown in FIGURE 1. As shown therein a document 11 to be recorded is placed upon a facing plate 10 and the appropriate one of control switches 16 is actuated to bring the machine into operation. Initially an image is presented by visual display screen 13 indicating the condition of the frame of the thermoplastic tape which is to be recorded upon. Assuming that the frame is blank, the "Record switch is actuated and the equipment automatically steps this frame to the exposure position. A light source illuminates the document 11 and the light reflected therefrom impinges upon the thermoplastic tape. Upon exposure to the reflected light, the recording medium develops electrostatic charge pattern conforming to the pattern of the reflected light. The equipment then automatically steps the tape to a developing position where it is heated to produce information bearing surface impressions. Immediately after development, the equipment steps the tape to a projection position and a visual image is placed on screen 13 which represents the surface contours on the recording medium. In this way, the operator visually verifies proper recordation within a matter of seconds after initiating the operation.

Either simultaneously with visual verification, or at any time thereafter, a hard or paper copy 15 of the image appearing on screen 13 may be produced in copier 14 by operation of the proper one of control switches 16.

Before proceeding to a description of the elements that enable the invention to attain the cited objectives, the opened panel 12 below the viewing screen should be noted. This area permits insertion and removal of tape cartridges by an operator. The contents of a tape cartridge are shown generally in FIGURES 6 and 7. These figures illustrate two possible configurations of equipment; however, the invention, of course, should not be limited to these specific configurations but only to the novel elements and techniques taught and suggested in connection therewith.

FIGURE 2 is a partial sectional view of a document recorder and illustrates the paths traversed by light from the originally reflected image to the projected visual display. This figure is presented to show a preferred arrangement of elements having a relationship to the light from the document or image being recorded; consequently, elements not germane to this aspect of the invention have been omitted to permit clarity of illustration. As shown in FIGURE 1, the document to be recorded is positioned on facing plate 10 and irradiated by light either from behind or, more preferably, from in front. This develops a light image that is deflected by mirror 20 and reduced by lens 21 for focusing on thermoplastic tape 26. As described hereinafter, a transfer voltage is applied to assist in imposing an electrostatic image upon the tape and it is thereafter translated in a plane substantially orthogonal to the plane of the paper to a developing position where it is heated to develop impressions in the surface. A Schlieren optical system thereupon projects light via the deformed tape to a mirror 22 which reflects it through lens 23 to a third mirror 24. From mirror 24 the image is again eflected to a partially transmissive mirror 25 which deflects a portion of the light to the viewing screen 13. The function of transmissive mirror 25 is twofold. First it presents a visual image for verification of proper recordation. Second it enables the transmission of sufficient light to serve as an input to copier 14. The specific nature of copier 14 is not fundamental to the present invention. Any number of copying devices operative in response to a specific light pattern may be employed. It is contemplated that this copier be of a dry developing type responsive to changes in light pattern to provide a clear and accurate print of the original document.

Although the preferred embodiment employs a transmissive mirror, copying might be performed by temporarily rotating a completely reflecting mirror out of the light path, thereby providing light of full intensity for copying purposes. It is also within the contemplation of the present invention that the copier may be remotely located, or located in other positions on the equipment, in which case other light paths would be easily developed while retaining the feature whereby the output from the projection system retains the dual characteristics of use for visual verification and for document reproduction.

Figures 3, 4, 7:
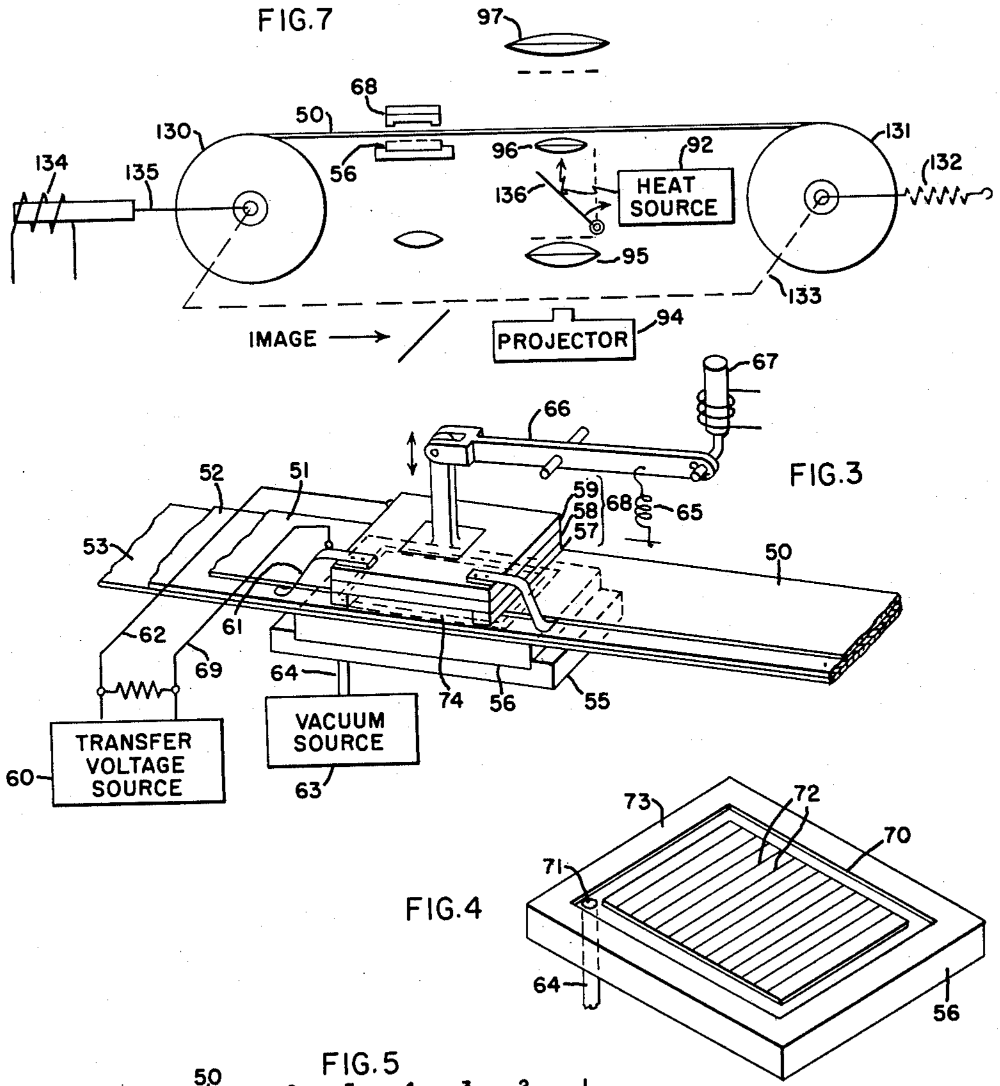
FIGURE 3 is a diagram of the unique elements at the exposure station which cooperate to provide well-resolved images with assured repeatability.
FIGURE 4 is a more detailed view of the vacuum manifold and grid plate used at the exposure station.
FIGURE 7 is a diagram of an alternative form of the processing stations at which the thermoplastic recordings are made.

FIGURE 3 is an illustrative diagram of the exposure station in one embodiment of the invention. This diagram shows a thermoplastic tape 50 positioned between a vacuum holder 56 and a photoconductive assembly 68. Tape 50 is made up of three layers: a thermoplastic layer 51 comprised of any suitable thermoplastic film material such as those described in patent application Serial No.

8,842, filed February 15, 1960, by William E. Glen, and assigned to the General Electric Company, assignee of the present invention; a transparent electrically conducting layer 52; and a transparent backing layer 53 comprised of a flexible material such as Cronar, Mylar or Teflon.

In one process of thermoplastic recording, an electrostatic charge pattern is developed on the surface of the thermoplastic. This charge pattern is deposited or generated by interaction with a photoconductive surface which is placed in close proximity to the thermoplastic. A transfer voltage, for example, in the order of 1200 volts, is applied between the thermoplastic and the photoconductor to assist in charge transfer across an air gap which separates the two.

In FIGURE 3 the photoconductor assembly 68 comprises a pair of shims 57 having a thickness of approximately 6 microns; a photoconductor 58 comprised of selenium, or some other suitable material; and a conductive substrate 59. A solenoid 67 in cooperation with member 66 and spring assembly 65 is coupled to the substrate 59 and adapted to urge the entire photoconductor assembly 68 toward film 50 when the solenoid is energized. Also, conductors 61 together with leads 62 and 69 permit a voltage source 60 to furnish the necessary transfer voltage.

It is of the utmost importance that a uniform air gap be maintained between photoconductor 58 and thermoplastic 51. Shims 57 are provided to establish this gap in the first instance; however, once a transfer voltage is applied and a charge pattern is developed the thermoplastic film tends to bow or bend into the air gap in response to the resulting force fields. This distortion of the original condition of planar parallelism is detrimental to the production of a sharp micro image. Furthermore, because the distortion is not always the same, it is not possible to obtain the same results with successive recordations. Holder 56 is adapted to remedy this problem. It is also operative to perform another vital function required for acceptable recordation on thermoplastic film.

In storing the optical information by producing a charge pattern in response to a light image, it is desirable under many circumstances to dissect the light image and store it as an extremely fine line structure rather than in a continuous point by point fashion. That is, the image is dissected and stored in a manner analogous to that in which a television picture is produced by breaking the image into 525 or so individual segments or lines, each of which is modulated in intensity. The charge pattern representing the light image is similarly fragmented into a plurality of spaced charge bearing strips separated by corresponding uncharged strips. Each charged selenium strip bears a charge distribution which corresponds to the light intensity variations of the corresponding image element.

The reason for dissecting the image and forming the charge pattern as a line structure of this type is determined in part by the characteristics of the mechanism for retrieving the information. Information retrieval with a Schlieren lens system, as herein suggested, takes place using a beam of light which is deflected or diffracted by the information bearing deformations. The light deflection or diffraction is produced by passage of the light through the sloping sides of the deformations. If a large black area of an image is recorded on a point by point basis, the charge density on the deformable medium within this area of the pattern will be high. Under these conditions, when the medium is heated, a large shallow groove having a flat bottom will be formed. The light in passing through the groove will not be bent in passing through the large flat portion but only at the sloping sides and, hence, will not be sensed. Consequently, the large black area will not be reproduced as such during retrieval. By dissecting the image into a plurality of elements and producing a fine line charge pattern, many small deformations rather than a single large groove are produced, so that the readout beam functions in the proper manner.

In addition, the problem of displacing a relatively large volume of the thermoplastic presents severe problems if it is necessary to produce a wide shallow groove. By dissecting the image before storage this problem is minimized. However, recognition of the need to dissect the charge pattern on the recording surface does not in itself offer a solution as to how to do it. Numerous suggestions appear in the art but they all suffer in their application because they yield poor resolution or create focusing difficulties. The present embodiment includes a light dissecting grid intimately associated with transparent vacuum holder 56. In fact this grid may be embossed, etched, or printed onto the surface of the holder plate. This provides light sampling in close proximity to the recording surface and yields improved resolution and focusing.

FIGURE 4 clearly shows the unique configuration of the transparent vacuum holding block 56. This view from the top reveals the vacuum channel 70 which; when placed in contact with the thermoplastic tape, encircles the area of a frame and, when evacuated, holds this area in intimate and rigid contact with its flat surface 73. An outlet 71 provides for interconnection of a vacuum source or pump. The framed area has the aforementioned grid impressed thereon in any suitable fashion.

With an appreciation of the individual elements appearing in FIGURE 3 a brief re-examination thereof is in order. Prior to exposure, the thermoplastic film is positioned at the exposure station as explained in detail hereinafter. Solenoid 67 is then energized attracting member 66 and thereby urging photoconductor assembly 68 toward thermoplastic film 50. It is particularly important that unitil this moment the surface of film 50 is untouched, because recordation is by means of surface impressions. Under the pressure of shims 57, film 50 makes contact with the surface of holding plate 56 and thereafter the vacuum channel is evacuated via outlet 64 to vacuum source 63.

The entire rigid assembly is then radiated with a light pattern 54 from the document being recorded, the light being transmitted through transparent member 55, vacuum holder 56, therornplastic film 50, and air gap 74, to impinge upon photoconductor 58. Simultaneously, a transfer voltage is applied from voltage source 60 via leads 62 and 69 to the conducting layers 59 and 52 respectively. Thus, a dissected electrostatic charge pattern representing the original document is developed.

Figure 5:
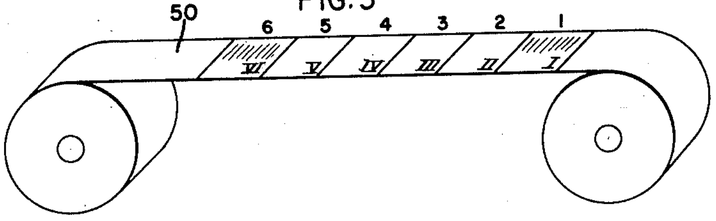
FIGURE 5 illustrates a strip of recording tape having images recorded in non-adjacent frames.

Before proceeding to a detailed description of the circuitry used to implement the features of the invention, reference is made to FIGURE 5 which serves to pictorially indicate the unique "add-on" capabilities of this recording system. FIGURE 5 shows a portion of thermoplastic tape 50 of the nature already described. The tape is divided by frames 1 through 6. The framing lines need not actually be present on the tape, inasmuch as they merely serve to graphically define the successive areas in which images may be recorded.

As indicated by the Roman numerals positioned in each frame, means may advantageously be incorporated for visually and/or automatically discriminating between each frame. For example, permanent surface deformations, visual indications, selectively located opaque tines, or other indicia may be impressed in each frame. Well known detecting arrangements are then used to detect which frame is being viewed. Such frame identifying techniques facilitate the rapid selection of desired frames and permit full appreciation of the features of selective erasure and add-on.

Because each frame is individually developed and because the recording medium is in no way light sensitive, a roll of thermoplastic tape may be preserved for long periods, throughout which periods additions and deletions may be continuously made. In the sample strip of FIGURE 5, frames 1 and 6 have permanent images recorded therein while intermediate frames 2, 3, 4 and 5 remain in their original state.

Figure 6:
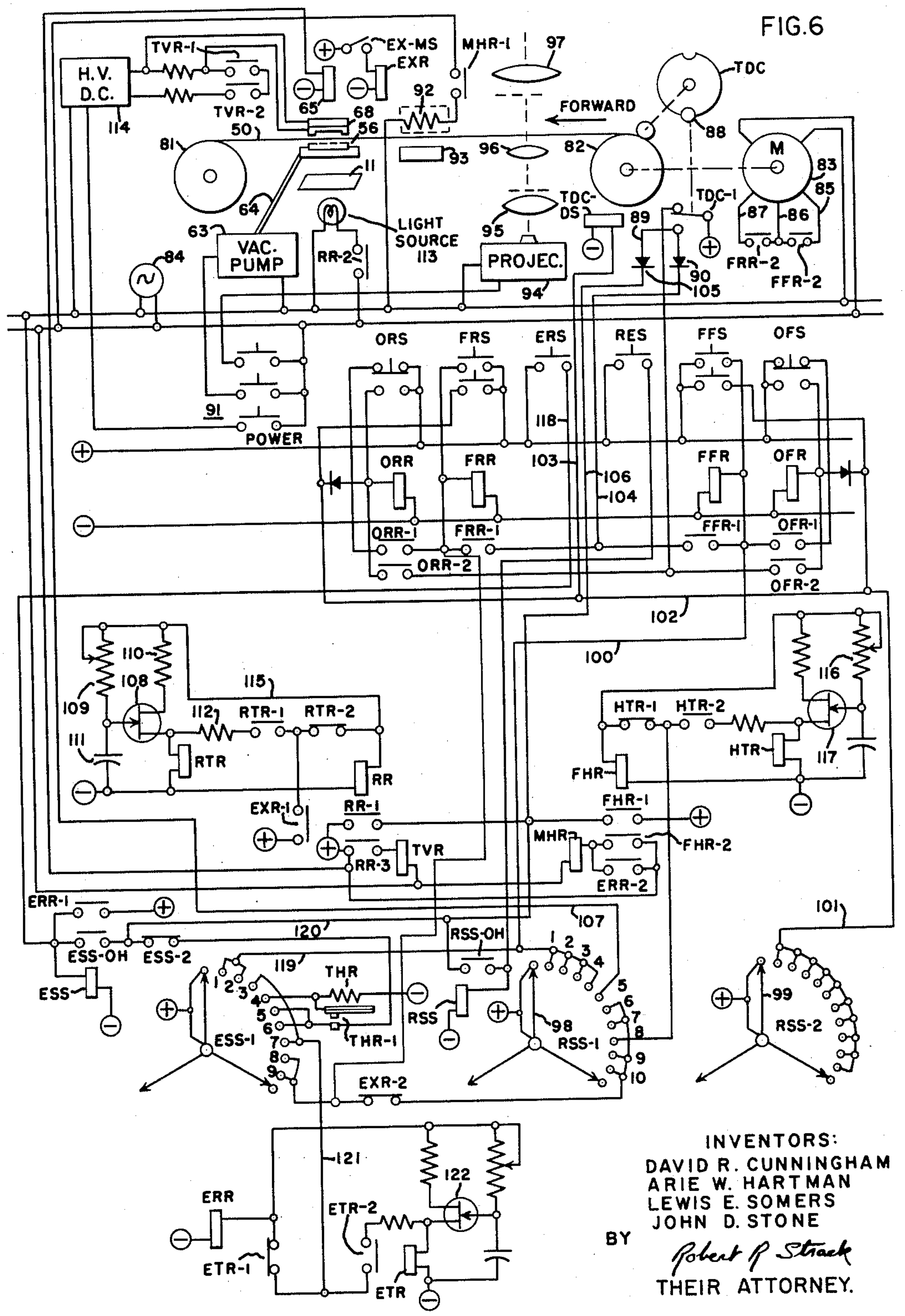
FIGURE 6 is a circuit schematic illustrating one embodiment of the invention.

The circuit schematic of FIGURE 6 shows the circuitry operative to control one embodiment of the invention. In order to more easily understand the functioning of this circuit, operating stations for exposing, developing and projecting, respectively, are diagrammatically shown at the top of the figure. A plurality of control switches are disposed below this diagram, the actuation of which determines the particular functions performed.

To provide brevity of description and clarity of drawing, several procedures have been followed. First, the detached contact form of relay representation has been used. In this form of representation, relay contacts are sometimes physically displaced from their actuating windings in order to locate them in closer proximity to portions of the circuit that are affected by their operation. Thus, contacts FRR–2 of relay FRR are shown connecting two terminals of motor 83 in the upper right quadrant of the sheet while the relay windings are located in the central portion of the drawing.

In order to easily recognize the functions of the operating elements, the designations thereof are acronyms of functional descriptions. For example, the windings of the Fast Reverse Relay are designated FRR. The contacts of each relay are identified by a two part designation comprising a first part identical to the winding designation and a second part comprising a numeral discretely identifying the particular contact pair. Accordingly, the contacts of relay FRR are designated FRR–1 and FRR–2. With minor exceptions, the relays are energized from a relatively low voltage direct current supply. Rather than include excessive interconnections with this supply, the appropriate wiring has been indicated by showing a (+) or (−) sign connected to the appropriate terminals as symbolic of terminals of such a direct current supply.

Generally speaking, three discrete operations are performed by the circuitry of FIGURE 6. The first operation involves selective translation and stopping of the tape 50 and is controlled by one-step-reverse switch ORS, fast-reverse switch FRS, one-step-forward switch OFS, and fast-forward switch FFS. The second operation involves recording and is controlled by recording switch RES. The third operation involves erasing and is controlled by erasing switch ERS. Each operation will be considered separately.

*Tape Translation*

As seen in the diagram at the top of FIGURE 6, the tape 50 is mounted on reels 81 and 82. A drive motor 83, energized by the alternating current source 84, is coupled to these reels in any appropriate fashion and operates upon shorting leads 85, 86 or 86, 87 to move the tape in a forward or reverse direction, respectively. A tape driven cam TDC is coupled to the recording tape 50 and rotates 180° each time the tape moves a distance equivalent to one frame. A cam follower 88 is urged against the surface of cam TDC and controls micro switch contacts TDC–1. Due to detents at the 180° positions, the contacts TDC–1 are in an upper position between frames and in a lower position throughout each frame. A detent solenoid TDC–DS is arranged to enable the micro switch and cam arrangement whenever necessary.

The diagram further shows an exposure station, such as described in connection with FIGURE 3; a developing station, comprising a heat source 92 and a reflector 93; and a projection station, comprising a projector 94 and representative lenses 95, 96, 97. As shown, it is assumed that a distance of four frames separates the exposure station from the projection station.

A plurality of control switches appear immediately below the described diagrammatic illustration. These switches control the entire operation of the circuit. It is assumed hereinafter that the "power" switch 91 is actuated.

In order to translate the tape one frame forward, one-step-forward switch OFS is operated. This causes energization of one-step-forward relay OFR in the series circuit from (+) to (−), including switch OFS and the windings thereof. Upon energization, relay OFR closes normally open contacts OFR–1 and OFR–2.

The control switches with the exception of those labeled "power," are designed to automatically return to their normal positions after removal of an operator's pressure. During operation of switch OFS, relay OFR is energized and establishes a holding circuit at contacts OFR–2 comprising the positive voltage terminal, tape-driven-cam contacts TDC–1 (in the upper right quadrant), windings OFR and the negative voltage terminal. Thus, relay OFR remains energized after the one-step-forward switch is released and until tape-driven-cam TDC leaves its normal position.

During energization of relay OFR the closure of contacts OFR–1 is effective when switch OFS returns to normal to energize fast-forward relay FFR in the circuit including: the positive voltage terminal, normally closed switch OFS, actuated contacts OFR–1, windings FFR, and the negative voltage terminal. Energization of fast-forward relay FFR causes closure of its normally open contacts FFR–1 and FFR–2. Closure of contacts FFR–2 (located near motor 83) causes motor 83 to operate in a forward direction, thereby transporting the tape in this direction. This tape movement moves cam TDC from its rest position and thereby activates micro switch TDC–1 removing the positive voltage from one-step-forward relay OFR and applying it instead to lead 89. A holding circuit for relay FFR is thereby created comprising the positive voltage terminal, contacts TDC–1, lead 89, rectifier 90, actuated contacts FFR–1, winding FFR, and the negative voltage terminal. Obviously, relay FFR will remain energized until translation of a frame results in the return of micro switch TDC–1 to normal.

When a full frame is translated, switch TDC–1 is reactivated and removes the positive supply from relay FFR and it is de-energized. Upon de-energization, contacts FFR–2 reopen and the motor 83 stops, stopping the tape one frame removed from its initial position.

A similar sequence of events occurs when one-step-reverse switch ORS is activated, the only difference being that one-step-reverse relay ORR and fast-reverse relay FRR are the operating electromagnetic control elements. In this case, leads 86 and 87 are interconnected by contacts FRR–2 to drive motor 83 in a reverse direction.

Often an operator will desire to rapidly transport the tape over a plurality of frames without the necessity of actuating a switch for each frame moved. Fast-forward and fast-reverse switches FFS and FRS are provided to implement this desire. A brief explanation of rapid forward operation will be sufficient to provide an understanding of both forward and reverse transport.

When it is desired to initiate rapid transport in a forward direction, switch FFS is actuated and energizes fast-forward relay FFR in an obvious circuit. Upon energization of relay FFR, the control functions previously outlined are performed. As long as switch FFS is held operated, tape 50 will be driven in a forward direction by motor 83. Once it is released, the next time the detent in cam TDC returns micro switch contacts TDC–1 to normal, the operation will terminate.

In order to more conveniently cause rapid transport, switch FFS may be designed in a fashion to require successive operations to engage and disengage the contacts. Such switches are well known.

*Recording Operation*

Having considered the means used for manually controlling tape transport, the automatic operation of the equipment during the recording operation may be considered. With the three station arrangement shown in FIGURE 6, recording requires: first, projection through a frame in order to determine whether or not it is suitable for exposure, i.e. whether or not it is empty; then, translation of that frame from the projection station to the exposure station where it is simultaneously subjected to a light image and a transfer voltage in order to develop an electrostatic charge image thereon; then, translation to the developing station where the particular frame is subjected to heat in order to establish the surface deformation pattern which represents the image projected by the original light source; and finally, translation to the projection station once more, in order to afford a visual indication of the proper recording. All of these operations are automatically performed following actuation of record control switch RES.

The various steps in the record operation are controlled by means of a record stepping switch RSS located at the lower right of the figure. The switch is of the nature comprising two banks of contacts RSS–1 and RSS–2, each having 12 contacts for selective connection with an independent arm 98 or 99, respectively. The arms 98 and 99 normally rest in a "home" position and are advanced one step at a time, each time winding RSS is de-energized. A set of three arms are shown in each switch bank to permit continuous stepping over 360° rotation without physical reset. It will also be noted that a pair of "off-home" contacts RSS–OH are closed whenever the arms are not in the "home" position.

Operation of record control switch RES causes energization of record stepping switch RSS in an abvious circuit. Upon release of record switch RES, the energizing path is broken and the arms 98 and 99 assume position "1." Also, off-home contacts RSS–OH are closed.

In position "1" switch RSS is effective to initiate forward drive of motor 83. Thus, a positive potential is applied via the contacts RSS–1 at position "1," and lead 100 to energize fast-forward relay FFR. As previously described, the consequent operation of normally open contacts FFR–2 causes drive motor 83 to operate in a forward direction. The second bank of contacts RSS–2 are operative via conductors 101, 102 and 103 to apply a positive potential to the detent solenoid TDC–DS which enables micro switch contacts TDC–1 to operate. Micro switch contacts TDC–1 apply a holding potential to relay FFR and an energizing potential to stepping switch RSS. The holding circuit comprises the positive voltage terminal, contacts TDC–1, rectifier 90, conductor 104, actuated contacts FFR–1, winding FFR, and the negative voltage terminal. The energization circuit comprises the positive voltage terminal, contacts TDC–1, rectifier 105, conductor 106, off-home contacts RSS–OH, winding RSS and the negative voltage terminal.

When the tape has been transported a single frame the corresponding 180° rotation of cam TDC is effective to return micro switch contacts TDC–1 to their original position, thereby removing the energization potential from stepping switch RSS and the holding potential from fast-forward relay FFR. Upon removal of potential, stepping switch RSS takes an additional step and moves its arms 98 and 99 to position "2." Removal of power from fast-forward relay FFR tends to stop motor 83; however, in the "2" position, a sequence of operation similar to that just described occurs, and results in stepping the tape and switch RSS to another frame and another position, respectively.

The described operating sequence occurs four times and after the fourth time, stepping contacts RSS–1 and RSS–2 reside in position "5." This switch position corresponds to having moved the originally viewed empty image frame to a position directly in front of the exposure station. As previously described, recording requires the illumination of the original document to develop a light image. This light image is then reduced and directed at tape 50 simultaneously with the application of a transfer voltage thereto.

When switch contacts RSS–1 are in position "5" relay FFR is not energized and therefore tape 50 remains stationary. The exposure lamp solenoid 65, described in connection with FIGURE 3 and illustrated in the diagram of this figure, is energized by applying positive voltage to its windings via lead 107. In addition to securing the film in the exposure station, this solenoid activates micro switch EX–MS which provides positive potential for energization of exposure relay EXR and may (though not shown) selectively evacuate the vacuum channel 70. Operation of relay EXR initiates the exposure cycle.

Closed contacts EXR–1 (lower left center of the figure) apply a positive potential via normally closed contacts RTR–2 to start a timing circuit comprising unijunction transistor 108 and to energize radiation relay RR. Radiation relay RR controls the illumination of the original document to generate a light pattern. Accordingly, at contacts RR–2 the alternating current source 84 is connected to a representative light source 113 appearing in the illustrative diagram. While the light is lit, transfer voltage is applied to create a field between the photoconductor and thermoplastic surface. At contacts RR–3, relay RR interconnects a transfer voltage relay TVR to the alternating current source. When so connected, relay TVR operates to close its contacts TVR–1 and TVR–2 (at the top of the figure) to connect high voltage source 114 to the exposure chassis. At contacts RR–1, relay RR causes application of a positive potential to record stepping switch RSS and consequently energizes the winding thereof.

These conditions prevail until the timing circuit containing unijunction transistor 108 has timed out.

The timing circuits used in this circuit are of a relatively conventional type. The bases of the transistors are connected in series with a resistor and relay winding between a positive and negative supply. Transistor 108, for example, has its upper base electrode serially connected via resistor 110 to a positive conductor 115 and its lower base electrode serially connected via the windings of the record timing relay RTR to the negative voltage terminal. The emitter is connected to positive conductor 115 by a variable impedance 109 and to the negative voltage terminal by a capacitor 111. Resistance 109 and capacitor 111 establish the time interval between application of a positive potential on conductor 115 and energization of relay RTR.

Timing commences when exposure relay contacts EXR–1 apply a positive potential to conductor 115 via normally closed contacts RTR–2. In response to this potential, capacitor 111 charges until the triggering point of the circuit is reached. At this time, a low impedance energizing circuit is provided for relay RTR comprising conductor 115, resistance 109, the emitter-base junction of transistor 108, winding RTR, and the negative voltage terminal.

The operation of relay RTR at the end of the exposure period terminates energization of radiating light source 113, disconnects the transfer voltage, and causes switch RSS to take another step. The light is disconnected by opening the energizing circuit of radiation relay RR at contacts RTR–2, which in turn opens contacts RR–2. The transfer voltage is disconnected by opening contacts RR–3 which disables transfer voltage relay TVR. Finally, the removal of positive potential from relay RSS at contacts RR–1 causes it to be de-energized and advance its switches one step to position "6."

At this point in time, the tape has been exposed and an electrostatic charge pattern representative of the document being copied appears thereon. This charge pattern must be developed by heating. In this embodiment, this requires transporting the image frame to the developing station.

When contacts RSS–1 are in position "6" a positive potential is applied to fast-reverse relay FRR and motor 83 is operated by closure of contacts FRR–2 to translate the tape in a reverse direction. As the motor begins translating the tape, tape-driven cam TDC moves its follower and the micro switch TDC–1 is operated. As previously noted, operation of this micro switch energizes the stepping switch RSS and upon subsequent de-energization switch RSS moves to position "7."

The circuit interconnections for position "7" are identical to those for position "6" and consequently the described sequence of events is repeated with the result of stepping switch RSS to position "8."

When stepping switch RSS is in position "8" it is indicative of the fact that the frame containing an exposed but undeveloped image is now in front of the developing station. Consequently, the heating source must be activated in order to bring the surface of the recording medium to a soft state and permit the electrostatic charge pattern thereon to form surface contours conforming to the document image being recorded. The energization of the heat source is initiated by the application of the positive voltage from contacts "8" of switch RSS–1 to energize a first heating relay FHR and to simultaneously start the heater timing circuit shown on the right side of the drawing. The heater timing circuit is similar to that used in conjunction with the recording operation. Its time constant is adjusted by resistance 116 to yield any desired period.

Upon energization, relay FHR closes contacts FHR–1 and FHR–2. Closure of contacts FHR–2 applies positive energization current to switch winding RSS in preparation for the taking of an additional step at the appropriate time. Closure of contacts FHR–1 provides an alternating current circuit path for the energization of the main heater relay MHR, which in turn connects the heating source 92 to the alternating current lines by closure of contacts MHR–1 appearing at the top of the figure.

When sufficient time for proper development has elapsed, the triggering potential on the emitter of unijunction transmitter 117 is reached and heater timing relay HTR is energized. This causes de-energization of relay FHR. Upon de-energization of relay FHR, relay MHR and switch RSS are disconnected, resulting in the end of heating and in the stepping of switch RSS to position "9."

The complete record operation is not complete until proper recordation is verified by a visual image on the viewing screen. Thus, tape 50 must be transported to the projection station. Stepping switch contacts RSS–1 in positions "9" and "10" accomplish this reverse stepping in a now obvious manner until the recorded image is in front of the projector.

In recapitulation it will be seen that by means of this illustrative embodiment of the invention an operator has been able to automatically record and verify the recordation seconds after actuation of the record control switch RES.

*Erasing Operation*

Among the unique features of the present invention, erasure is extremely important. The ability to erase a previously recorded image enables an operator to eliminate an inadvertently recorded document, to eliminate an erroneous or poor recordation, or to remove an image that had been recorded at some time previously, and rerecord in its place.

In order to effectively erase, one must be assured of being able to select the desired frame and thereafter investigate to verify the erasure. The erase operation is initiated by closing the erase control switch ERS located near the top of the figure. Thereafter, the tape is automatically moved from the projection position to the erasing station. At this station (the same position as used for developing) the previously mentioned heat source 92 is once again used to soften the tape. This time, however, it eliminates the surface deformations.

Following erasure, the tape is automatically returned to the projection station and proper erasure is verified by the operator. The operating sequence involved in the erasing operation takes place under control of the erase stepping switch ESS appearing in the lower left quadrant. This stepping switch is similar to switch RSS.

Upon closure of control, switch ERS, a positive potential is applied via conductor 118 to the winding of stepping switch ESS and it is energized. When erase control switch ERS is released, stepping switch ESS moves contacts ESS–1 to position "1," closing off-home contacts ESS–OH and re-closing contacts ESS–2.

With ESS–1 in position "1" positive potential is applied via conductors 119 and 100 to energize fast-forward relay FFR. As previously described, energization of relay FFR causes motor 83 to operate in a forward direction. When tape driven cam TDC moves off its normal position, micro switch TDC–1 operates and provides a holding circuit for relay FFR in an obvious circuit. Closure of micro switch contacts TDC–1 also provides an energizing voltage for erase-stepping switch ESS in a circuit including: contacts TDC–1, rectifier 105, conductors 106 and 120, operated off-home contacts ESS–OH, and the switch winding.

When the cam TDC has rotated 180°, contacts TDC–1 return to normal and power is removed from both stepping switch ESS and relay FFR. The stepping switch, therefore, moves to position "2." In this new position the above operating sequence is repeated, driving the tape one more frame forward and concluding with contacts ESS–1 in position "3." The image frame is now before heat source 92.

In position "3" contacts ESS–1 apply positive potential via conductor 121 and normally closed contacts ETR–1 to energize erase relay ERR and to start the erase timing circuit comprising unijunction transistor 122. This timing circuit is similar to those previously described and upon an elapse of a pre-determined time interval an erase timing relay ETR, in series with the base circuit, is energized. During the timing interval, however, the energized condition of relay ERR causes closure of its normally open contacts ERR–1 and ERR–2. The first contact closure supplies energizing potential to stepping switch ESS and the second is operative to provide alternating current power to main heater relay MHR.

As previously described in connection with the developing of an exposed image, operation of relay MHR causes closure of contacts MHR–1 and connects heating source 92 to the alternating current lines. In this case, however, the heat is operative to erase any material previously recorded.

Upon an elapse of the pre-determined time interval, unijunction transistor 122 assumes a conducting state and relay ETR is energized. The resultant opening of normally closed contacts ETR–1 causes de-energization of relay ERR and this, in turn, results in de-energization of stepping switch ESS and main heating relay MHR. Heat is therefore removed and the erase-stepping switch ESS proceeds to position "4."

In position "4" a positive voltage is applied to a thermal relay THR which is set to operate after approximately two seconds of power application. This relay may take any known form; for example, it may be of the bimetalic strip type. When the two second time interval has elapsed, contacts THR–1 produce a short circuit between position "4" and conductor 119′. Thus, positive voltage is applied via conductor 119′ and contacts ESS–2 and ESS–OH to energize stepping switch ESS. Upon cooling, relay THR resumes its previous condition, contacts THR–1 open, the energization of switch ESS is removed, and the stepping switch moves to position "5." Positions "5" and "6" are traversed by the stepping switch due to the interposition of interruptor contacts ESS–2. This interposition ceases when position "7" is attained.

Position "7" has the same connections as position "3" and therefore heat is once again applied to the tape due to the energization of relays ERR and MHR. Upon elapse of the pre-selected time interval, unijunction transistor 122 again assumes a conducting state and the heat is removed, with the attendant stepping of erase-stepping switch ESS to position "8."

It now remains to again transport the recording medium to the projection station in order to visually verify the fact that adequate erasure has occurred. In light of the previous discussion, it is believed unnecessary to describe the circuitry for performing this reverse stepping operation.

The foregoing circuit description has explained in detail the means used for uniquely creating an image upon a recording medium, visually verifying that image and selectively erasing that image. It will be understood by those familiar with the art that some of the illustrated means may be modified using the skill of the average engineer and without departing from the teachings herein. For example, it will be recognized that more heating is required to erase an image than to develop an image. In order to apply this extra degree of heat, means have been shown for using the same heat source as used for development, only twice. The same results could be obtained by applying the heat for a longer time interval or perhaps by applying a larger potential to the heating element.

The novel features of this invention are not restricted to the three station recording arrangement described in conjunction with FIGURE 6. An alternate arrangement is shown in FIGURE 7 wherein only two stations are used. In the embodiment of FIGURE 7, tape reels 130 and 131 are rigidly maintained in fixed positions with respect to each other by means indicated with dashed lines 133. The combined unit is normally kept in the illustrated position due to the compressive influence of spring means 132. In this position the frame of tape 50 immediately adjacent to lens 96 may be either visually examined by projected light from projector 94 or may be subjected to heat from source 92. Thus, this "normal" position has the facilities for projecting light images for visual display or generation of duplicate originals, and for either developing electrostatic charge patterns into permanent surface impressions or erasing pre-existing surface impressions.

The Schlieren projection technique that permits visual image formation is diagrammatically suggested by lenses 95, 96 and 97. Heating of the tape may be implemented by the inclusion of a heat deflecting or focusing mirror 136, adjusted to direct heat from a source 92 to the appropriate area of tape 50. This mirror 92 may be transmissive to the visual light of projector 94, or it may be rotated to a non-obstructing position during projection.

The development of an electrostatic charge pattern on tape 50 may be performed at a second station with the apparatus of FIGURE 7. This second station has equipment corresponding to the arrangement shown in FIGURE 3. To translate the frame originally being projected, it is merely necessary to energize solenoid 134. Means, indicated by line 135, thereupon act to move the entire tape unit to the appropriate location. Following exposure, solenoid 134 is released and the tape unit returns the exposed frame to the first station for developing and projection.

Obviously, this second embodiment of the recording apparatus permits more rapid recordation because it eliminates several positioning steps.

The foregoing description has disclosed a unique means for securing a film medium in a fixed position during exposure to light and an electric field. It is understood that numerous modifications and variations of the described arrangement may be made without departing from the spirit and scope of the invention as defined by the following claims.

What we claim as new and desire to secure by Letters Patent of the United States is:

1. An exposure station for developing an electrostatic charge on a flexible thermoplastic recording medium comprising a photoconductive surface, a transparent plate having opaque markings thereon and a channel on a surface adjacent to said recording medium, means for evacuating said channel to draw said recording medium into intimate contact with said plate, and means for positioning the surface of said recording medium a pre-selected distance from said photoconductive surface and applying light radiation to said photoconductive surface through said plate.

2. An exposure station for developing an electrostatic charge on a flexible thermoplastic recording medium comprising a photoconductive surface, a transparent plate having opaque markings thereon and a channel on the surface thereof, means for urging said recording medium into contact with the surface of said plate, means for evacuating said channel to draw said recording medium into intimate contact with the surface of said plate, and means for positioning the surface of said recording medium a pre-selected distance from said photoconductive surface and applying light radiation to said photoconductive surface through said plate.

3. An exposure station for developing an electrostatic charge on a flexible thermoplastic recording medium comprising a photoconductor on one side of said recording medium, shims of precise thickness fixed to the surface of said photoconductor adjacent to said recording medium, a transparent plate on the other side of said recording medium having opaque markings thereon and a channel on the surface adjacent to said recording medium, means coupled to said photoconductor for bringing said shims into intimate contact with the surface of said recording medium, means for evacuating said channel to draw said recording medium into intimate contact with the surface of said plate, and means for applying light radiation to said photoconductor through said plate.

4. Exposure apparatus for developing an electrostatic charge on a flexible thermoplastic tape comprising a rigid photoconductive assembly on one side of said tape having spacing means affixed to the surface adjacent to said tape, a rigid transparent plate on the other side of said tape having opaque markings and a channel on the surface adjacent to said tape, means attached to said photoconductive assembly for bringing said spacing means into intimate contact with the surface of said tape, means attached to said plate for evacuating said channel to draw said tape into intimate contact with the surface of said plate, and means for applying light radiation to said photoconductive assembly through said plate.

5. Exposure apparatus for developing an electrostatic charge on a flexible thermoplastic tape comprising a rigid photoconductive assembly on one side of said tape having spacing means affixed to the surface adjacent to said tape, a rigid transparent plate on the other side of said tape having opaque markings and a channel on the surface adjacent to said tape, means for positioning selected areas of said tape between said photoconductive assembly and said transparent plate, means attached to said photo conductive assembly and operative when said tape is positioned for bringing said spacing means into intimate contact with the surface of said tape, means attached to said plate for evacuating said channel to draw said tape into intimiate contact with the surface of said plate, and means for applying light radiation to said photoconductive assembly through said plate.

6. Exposure apparatus for developing an electrostatic charge on a flexible thermoplastic tape comprising a rigid photoconductive assembly on one side of said tape having spacing means affixed to the surface adjacent to said tape, a rigid transparent plate on the other side of said tape having opaque markings and a channel on the surface adjacent to said tape, means for positioning selected areas of said tape between said photoconductive assembly and said tranparent plate, means attached to said photoconductive assembly and operative when said tape is positioned for urging said assembly against said tape until the opposing surface of said tape bears against said plate and said spacing means are in intimate contact with said tape, means attached to said plate for evacuating said channel when said tape is positioned to draw said tape into intimate contact with the surface of said plate, and means for applying light radiation to said photoconductive assembly through said plate.

7. Exposure apparatus for developing an electrostatic charge on a flexible thermoplastic tape comprising a photoconductive assembly on one side of said tape comprising a conductive layer, a photoconductive layer, and spacing members affixed to the surface adjacent to said tape, a rigid transparent plate on the other side of said tape having opaque markings and a channel on the surface adjacent to said tape, means for positioning selected areas of said tape between said photoconductive assembly and said transparent plate, means attached to said photoconductive assembly and operative when said tape is positioned for urging said assembly against said tape until the opposing surface of said tape bears against said plate and said spacing means are in intimate contact with said tape, means attached to said plate for evacuating said channel when said tape is positioned to draw said tape into intimate contact with the surface of said plate, means operative when said tape is secured between said photoconductive assembly and said transparent plate to establish an electric field between said tape and the conductive layer of said assembly, and further means when said tape is secured between said photoconductive assembly and said transparent plate to apply light radiation through said plate to said photoconductive layer.

No references cited.